US008621578B1

(12) United States Patent
Blomquist et al.

(10) Patent No.: US 8,621,578 B1
(45) Date of Patent: Dec. 31, 2013

(54) METHODS AND SYSTEMS FOR PROTECTING WEBSITE FORMS FROM AUTOMATED ACCESS

(75) Inventors: Scott A. Blomquist, Portland, OR (US);
Chad Blomquist, Portland, OR (US);
Koesmanto Bong, Portland, OR (US);
Christopher Lee, Portland, OR (US);
John Whitlock, Portland, OR (US)

(73) Assignee: Confident Technologies, Inc., Solana Beach, CA (US)

( * ) Notice: Subject to any disclaimer, the term of this patent is extended or adjusted under 35 U.S.C. 154(b) by 861 days.

(21) Appl. No.: 12/332,266

(22) Filed: Dec. 10, 2008

(51) Int. Cl.
*H04L 29/06* (2006.01)
*G06F 21/00* (2013.01)

(52) U.S. Cl.
USPC .............................................. 726/5; 713/182

(58) Field of Classification Search
None
See application file for complete search history.

(56) References Cited

U.S. PATENT DOCUMENTS

| | | | |
|---|---|---|---|
| 5,276,314 | A | 1/1994 | Martino et al. |
| 5,428,349 | A | 6/1995 | Baker |
| 5,465,084 | A | 11/1995 | Cottrell |
| 5,559,961 | A | 9/1996 | Blonder |
| 5,608,387 | A | 3/1997 | Davies |
| 5,664,099 | A | 9/1997 | Ozzie et al. |
| 5,821,933 | A | 10/1998 | Keller et al. |
| 5,928,364 | A | 7/1999 | Yamamoto |
| 5,948,061 | A | 9/1999 | Merriman et al. |
| 6,102,406 | A | 8/2000 | Miles et al. |
| 6,209,104 | B1 | 3/2001 | Jalili |
| 6,351,634 | B1 | 2/2002 | Shin |
| 6,686,931 | B1 | 2/2004 | Bodnar |
| 6,718,471 | B1 | 4/2004 | Kashima |
| 6,720,860 | B1 | 4/2004 | Narayanaswami |
| 6,792,466 | B1 | 9/2004 | Saulpaugh et al. |
| 6,823,075 | B2 | 11/2004 | Perry |
| 6,862,594 | B1 | 3/2005 | Saulpaugh et al. |
| 6,895,387 | B1 | 5/2005 | Roberts et al. |
| 6,950,949 | B1 | 9/2005 | Gilchrist |

(Continued)

FOREIGN PATENT DOCUMENTS

| | | |
|---|---|---|
| JP | 11345206 A | 12/1999 |
| JP | 2001092785 A | 4/2001 |

(Continued)

OTHER PUBLICATIONS

Dhamija et al., Déjà vu: a user study using images for authentication. Proceedings of the 9th USENIX Security Symposium, Denver, CO, Aug. 14-17, 2000 (15 pages).

*Primary Examiner* — Gilberto Barron, Jr.
*Assistant Examiner* — Malcolm Cribbs
(74) *Attorney, Agent, or Firm* — San Diego IP Law Group, LLP

(57) ABSTRACT

Systems and methods to tell apart computers and humans using image recognition task having a dynamic graphical arrangement of randomly selected images. The images can be arranged as a grid or matrix for presentation on a device display for authentication of a user as human. The kinds of graphical images can be derived from a selected category for the image recognition task. A series of randomly generated access codes corresponding to the images can be displayed with the images. The user may enter the access codes corresponding to images from the selected category. An authentication server can compare the access code entry to an authentication reference code corresponding to the particular arrangement of images. The selection of images, their arrangement and their corresponding access codes, may dynamically change in between verification sessions.

17 Claims, 5 Drawing Sheets

(56) References Cited

U.S. PATENT DOCUMENTS

| | | |
|---|---|---|
| 6,980,081 B2 | 12/2005 | Anderson |
| 6,981,016 B1 | 12/2005 | Ryan |
| 7,021,534 B1 | 4/2006 | Kiliccote |
| 7,028,192 B2 | 4/2006 | Butler |
| 7,093,282 B2 | 8/2006 | Hillhouse |
| 7,130,831 B2 | 10/2006 | Howard et al. |
| 7,219,368 B2 | 5/2007 | Juels et al. |
| 7,225,157 B2 | 5/2007 | Howard et al. |
| 7,240,367 B2 | 7/2007 | Park |
| 7,451,323 B2 | 11/2008 | Abe et al. |
| 7,536,556 B2 | 5/2009 | Federova et al. |
| 7,552,330 B2 | 6/2009 | Kokumai |
| 7,574,739 B2 | 8/2009 | Shirakawa |
| 7,577,994 B1 | 8/2009 | Sobel et al. |
| 7,680,815 B2 | 3/2010 | Komine et al. |
| 7,844,825 B1 | 11/2010 | Neginsky |
| 2001/0007097 A1 | 7/2001 | Kim |
| 2001/0013039 A1 | 8/2001 | Choi |
| 2001/0037314 A1 | 11/2001 | Ishikawa |
| 2001/0037468 A1 | 11/2001 | Gaddis |
| 2002/0019768 A1 | 2/2002 | Fredrickson et al. |
| 2002/0083347 A1 | 6/2002 | Taguchi |
| 2002/0094868 A1 | 7/2002 | Tuck et al. |
| 2002/0188872 A1 | 12/2002 | Willeby |
| 2003/0046551 A1 | 3/2003 | Brennan |
| 2003/0084275 A1 | 5/2003 | David et al. |
| 2003/0093699 A1 | 5/2003 | Banning et al. |
| 2003/0177248 A1 | 9/2003 | Brown et al. |
| 2003/0191947 A1 | 10/2003 | Stubblefield et al. |
| 2003/0210127 A1 | 11/2003 | Anderson |
| 2003/0215110 A1 | 11/2003 | Rhoads et al. |
| 2004/0010721 A1 | 1/2004 | Kirovski et al. |
| 2004/0030934 A1 | 2/2004 | Mizoguchi et al. |
| 2004/0172564 A1 | 9/2004 | Federova et al. |
| 2004/0230843 A1 | 11/2004 | Jansen |
| 2004/0250138 A1 | 12/2004 | Schneider |
| 2004/0260955 A1 | 12/2004 | Mantyla |
| 2005/0010758 A1 | 1/2005 | Landrock et al. |
| 2005/0010768 A1 | 1/2005 | Light et al. |
| 2005/0071637 A1 | 3/2005 | Shirakawa |
| 2005/0071686 A1 | 3/2005 | Bagga et al. |
| 2005/0076357 A1 | 4/2005 | Fenne |
| 2005/0169496 A1 | 8/2005 | Perry |
| 2005/0268100 A1 | 12/2005 | Gasparini et al. |
| 2005/0268101 A1 | 12/2005 | Gasparini et al. |
| 2005/0268107 A1 | 12/2005 | Harris et al. |
| 2005/0276442 A1 | 12/2005 | Alasia et al. |
| 2005/0283443 A1 | 12/2005 | Hardt |
| 2005/0283614 A1 | 12/2005 | Hardt |
| 2006/0020812 A1 | 1/2006 | Steinberg et al. |
| 2006/0020815 A1 | 1/2006 | Varghese et al. |
| 2006/0053293 A1 | 3/2006 | Zager et al. |
| 2006/0075027 A1 | 4/2006 | Zager et al. |
| 2006/0075028 A1 | 4/2006 | Zager et al. |
| 2006/0085360 A1 | 4/2006 | Grim, III et al. |
| 2006/0105739 A1 | 5/2006 | Frank et al. |
| 2006/0174339 A1 | 8/2006 | Tao |
| 2006/0183551 A1 | 8/2006 | Prudent |
| 2006/0206717 A1 | 9/2006 | Holt et al. |
| 2006/0206918 A1 | 9/2006 | McLean |
| 2006/0206919 A1 | 9/2006 | Montgomery et al. |
| 2006/0230435 A1 | 10/2006 | Kokumai |
| 2006/0248344 A1 | 11/2006 | Yang |
| 2007/0023506 A1 | 2/2007 | Lagadec et al. |
| 2007/0033102 A1 | 2/2007 | Frank et al. |
| 2007/0041621 A1 | 2/2007 | Lin et al. |
| 2007/0074119 A1 | 3/2007 | Komine et al. |
| 2007/0130618 A1* | 6/2007 | Chen ................................. 726/8 |
| 2007/0198846 A1 | 8/2007 | Watari |
| 2007/0250920 A1 | 10/2007 | Lindsay |
| 2007/0277224 A1* | 11/2007 | Osborn et al. .................... 726/2 |
| 2008/0052245 A1 | 2/2008 | Love |
| 2008/0141351 A1 | 6/2008 | Park |
| 2008/0216163 A1* | 9/2008 | Pratte et al. ....................... 726/7 |
| 2008/0222710 A1 | 9/2008 | Blagsvedt et al. |
| 2008/0235788 A1 | 9/2008 | El Saddik et al. |
| 2008/0307310 A1 | 12/2008 | Segal et al. |
| 2008/0320310 A1 | 12/2008 | Florencio et al. |
| 2009/0037339 A1 | 2/2009 | Ancell et al. |
| 2009/0038006 A1 | 2/2009 | Traenkenschuh et al. |
| 2009/0077629 A1* | 3/2009 | Douceur et al. .................. 726/2 |

FOREIGN PATENT DOCUMENTS

| | | |
|---|---|---|
| KR | 20020026636 A | 4/2002 |
| KR | 20040032869 A | 4/2002 |
| KR | 20040047155 A | 6/2004 |
| KR | 20040067123 A | 1/2006 |
| KR | 20060127850 A | 12/2006 |
| NZ | 541711 A | 7/2005 |
| WO | 02054199 A1 | 7/2002 |
| WO | 2006064241 A2 | 6/2006 |

* cited by examiner

METHODS AND SYSTEMS FOR PROTECTING WEBSITE FORMS FROM AUTOMATED ACCESS

FIELD OF THE INVENTION

The present invention is directed to a method and system of telling apart a human from a computer. In particular, the present invention is directed to a graphical image verification system.

SUMMARY OF THE INVENTION

The present invention is directed to a method for generating a completely automated test to tell computers and humans apart. The method comprises generating a dynamic graphical arrangement of images. The dynamic graphical arrangement comprises at least one randomly selected image from a selected category chosen for an image recognition task and at least one image not from the selected category. Each image of the dynamic graphical arrangement comprises a unique and randomly generated access code. The dynamic graphical arrangement of images is presented to the user and the image recognition task is communicated to the user. An input is received from the user access device. The input comprises the unique randomly generated access code corresponding to the at least one image from the selected category. The input from the user access device is verified to an authenticating reference code to determine the user is a human and not a computer.

The present invention is further directed to a method for selectively accepting access requests from a client computer connected to a server computer by a network. The method comprises receiving an access request from the client computer at an authentication server. The authentication server generates a dynamic graphical arrangement of images in response to the access request. The dynamic graphical arrangement of images comprises at least one randomly selected image from a selected category chosen for an image recognition task and at least one image not from the selected category. The dynamic graphical arrangement of images is presented on an output device of the client computer. The user is instructed to select images from the selected category to generate an input. The input from the client computer is transmitted to the authentication server. The input comprises a user selection of at least one image. The access request is accepted if the user selection of the at least one image corresponds to the image chosen from the selected category and otherwise denying the access request.

Further still, the present invention is directed to a method in a computing system for providing secure transactions. The method comprises receiving a request to perform a transaction from a user and creating a transaction verification page comprising information regarding the transaction. The transaction verification page comprises a dynamic graphical arrangement of images and requests the user to select at least one image from a selected category of images chosen for an image recognition task to commit the transaction. The transaction verification page is transmitted to the client. Next, an image selection is received from the client. The image selection is input to the transaction verification page by the user. In response to the image selection matching the image displayed on the transaction verification page from the selected category, the transaction represented by the transaction verification page is committed and in response to the image selection input not matching the image displayed on the transaction verification page from the selected category, transaction represented by the transaction verification page is aborted.

The present invention is also directed to a computer system for selectively accepting access requests from an access device connected to a server computer by a network. The computer system comprises a memory and a processor to execute instructions stored in the memory. The memory stores instructions to receive an access request from the access device, generate a dynamic graphical arrangement of images in response to the access request, present the dynamic graphical arrangement of images on an output device of the access device, instruct a user to select each image from the chosen category, and receive an input from the access device. The dynamic graphical arrangement of images comprises at least one randomly selected image from at least one selected category chosen for an image recognition task. The input comprises a user selection of at least one image from the at least one selected category. The access request is accepted if the input from the access device corresponds to the images from the selected category chosen for the image recognition task and otherwise denies the access request.

DETAILED DESCRIPTION OF THE INVENTION

The present invention provides a system and method to tell apart a human from a computer using a test generally known as a Completely Automated Public test to Tell Computers and Humans Apart (hereinafter "CAPTCHA"). Websites, and in particular web-based forms, are often the target of malicious programs designed to register for service on a large scale, consume large amounts of resources or bias results in on-line polls or voting. In response to these malicious programs CAPTCHA-based test have been developed in an attempt to discern between a human's attempt to access a website and automated access to a website.

CAPTCHA tests attempt to require a user to correctly answer a question which only a human could provide a correct answer. Most current CAPTCHA tests are text based and require the user to interpret and input a distorted piece of test presented to the user. However, user friendliness is lacking and automated attacks are not eliminated by current CAPTHCA tests. Thus, there remains a need for improved systems and methods to tell apart a human from a computer when allowing access to a website.

Computer networks, particularly those with global reach such as the Internet, have greatly influenced the way that individuals, companies and institutions conduct transactions, and store and retrieve documents, images, music, and video. Convenience, ease of use, speed, and low overhead costs are contributing factors to the widespread use of the Internet for purchasing goods as well as conducting transactions. Entire industries have emerged as a result of the evolution of the Internet.

Securing access to many computer systems or computer networks generally requires the user to register a user identity and create a profile with the provider's website. Further, many websites are established or function to collect information from Internet users via a poll, message board, or comment application. These websites allow users to add content to the website and are therefore often susceptible to attack by automated programs. Therefore, there is an ongoing need for CAPTCHA solutions to protect such websites from automated programs.

The present invention provides a method and system for an improved CAPTCHA test which requires users to select randomly generated images from a dynamic graphical arrangement of images. The images the user must select are based on selected categories selected by the verification service provider.

Figure 1:
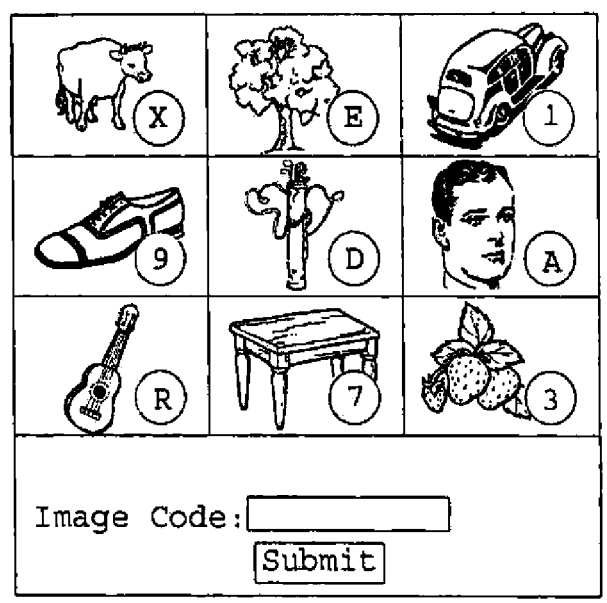
FIG. 1 illustrates an example of a dynamic graphical arrangement of the present invention.

Referring now to the Figures and specifically to FIG. 1, there is shown therein an embodiment of the CAPTCHA-like test of the present invention. FIG. 1 shows a dynamic graphical arrangement comprising a plurality of images arranged in a three by three grid. Each of the images shown therein comprises a unique randomly generated access code superimposed over or onto the image. As shown in FIG. 1, the access code may comprise an alphanumeric character. CAPTCHA techniques could be employed to obfuscate the access code so that it is not machine-readable.

Figure 4:
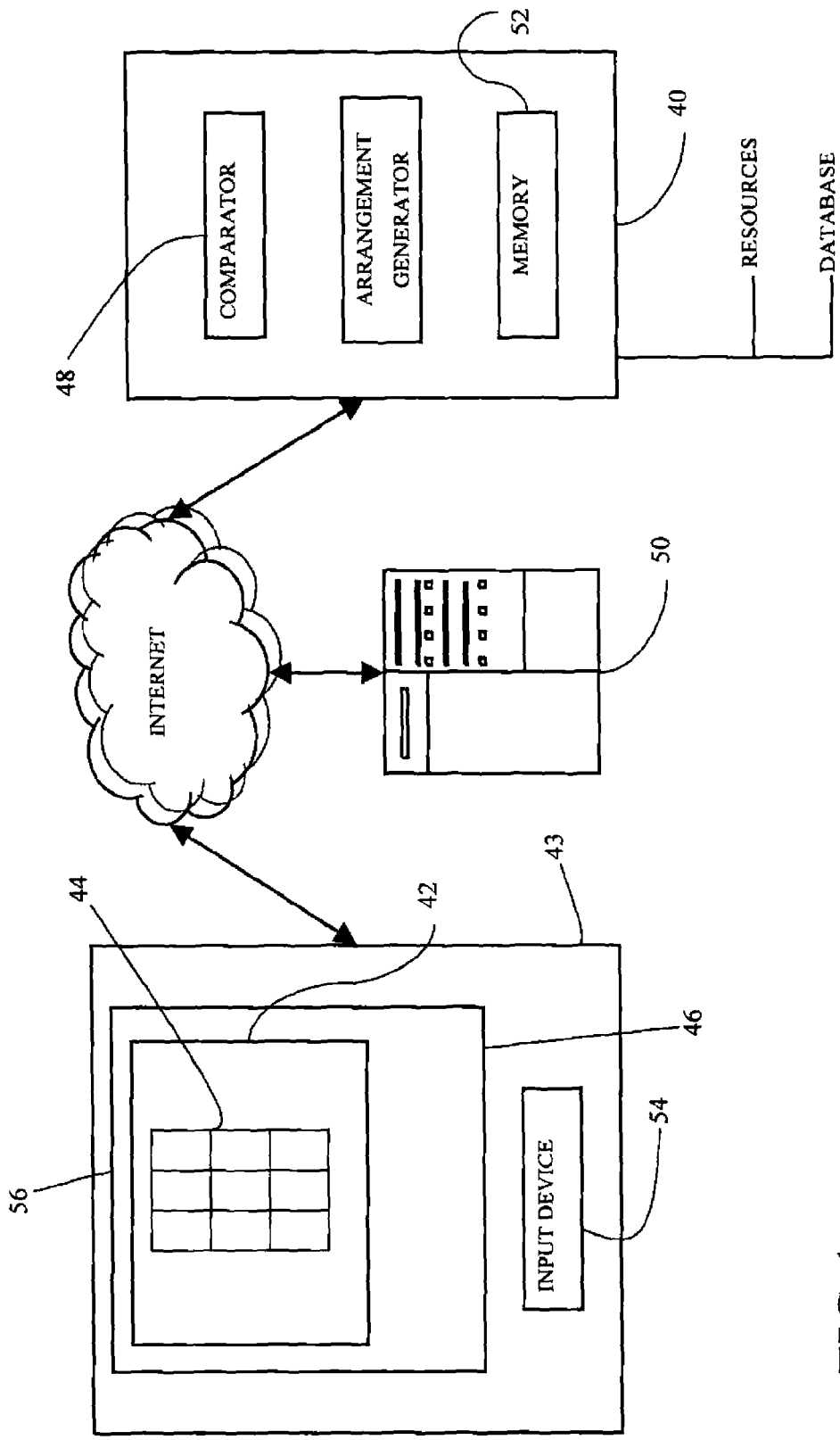
FIG. 4 is an illustration of client/server architecture for generating a completely automated test comprising the dynamic graphical arrangement of FIG. 1 to tell computers and humans apart over the Internet.

As shown on FIG. 1, the cells of dynamic graphical arrangement may display a variety of images from different categories. The location of the images in the grid is randomized. The specific image for each category is chosen from a database of images for that specific category. Accordingly, the dynamic graphical arrangement may comprise at least one randomly selected image from a category selected for an image recognition task and at least one image not from the selected category. As discussed hereinafter the selected category may be both determined by the test service provider or the web site and communicated to the user on a transaction verification page (FIG. 4).

One skilled in the art will appreciate that the dynamic graphical arrangement may comprise a plurality of images from the selected category and several images not from the selected category yet also from several different categories. Additionally, the dynamic graphical arrangement presented to the user may comprise one or more images known to belong to the selected category, one or more images known not to belong in the selected category and one or more images suspected to belong in the selected category. In such situation, the user is still granted access to the website upon successfully selecting the images known to belong to the selected category and avoiding selection of the images known to not belong, and provides the service provider with an interpretation as to the proper category for the images suspected to belong to the selected category. Thus, the system and method of the present invention provides an automated way of learning how to categorize images based upon human feedback via the user input.

The images presented the user in the dynamic graphical arrangement may also comprise advertisements. The image selected to be displayed may be based on the websites, the advertisement campaigns, and other parameters. When the user places the cursor over the advertisement image, additional information and links about the advertisement may be provided (which could otherwise be displayed automatically without cursor movement by the user). Additionally, the advertisement image may comprise a hyperlink to the advertiser's website. If the user chooses to follow the hyperlink, the destination of the hyperlink may open a new window with the advertiser's website displayed therein. When the user finishes browsing the advertisement website, the user will return to the dynamic graphical arrangement and continue its attempt to access the desired website. The user would not need to reenter any information previously entered to allow the user to view the transaction verification page after viewing an advertisement link. Alternatively, the system may require the user to reenter its information after viewing an advertisement link after predetermined amount of time has passed for security purposes. When the user finishes viewing the advertisement link, the graphical arrangement is refreshed and displayed again.

While a series of one or more graphical images within a presented graphical arrangement can be dynamically altered in between access attempts, the selected category can remain the same from the perspective of the user.

Figure 2:
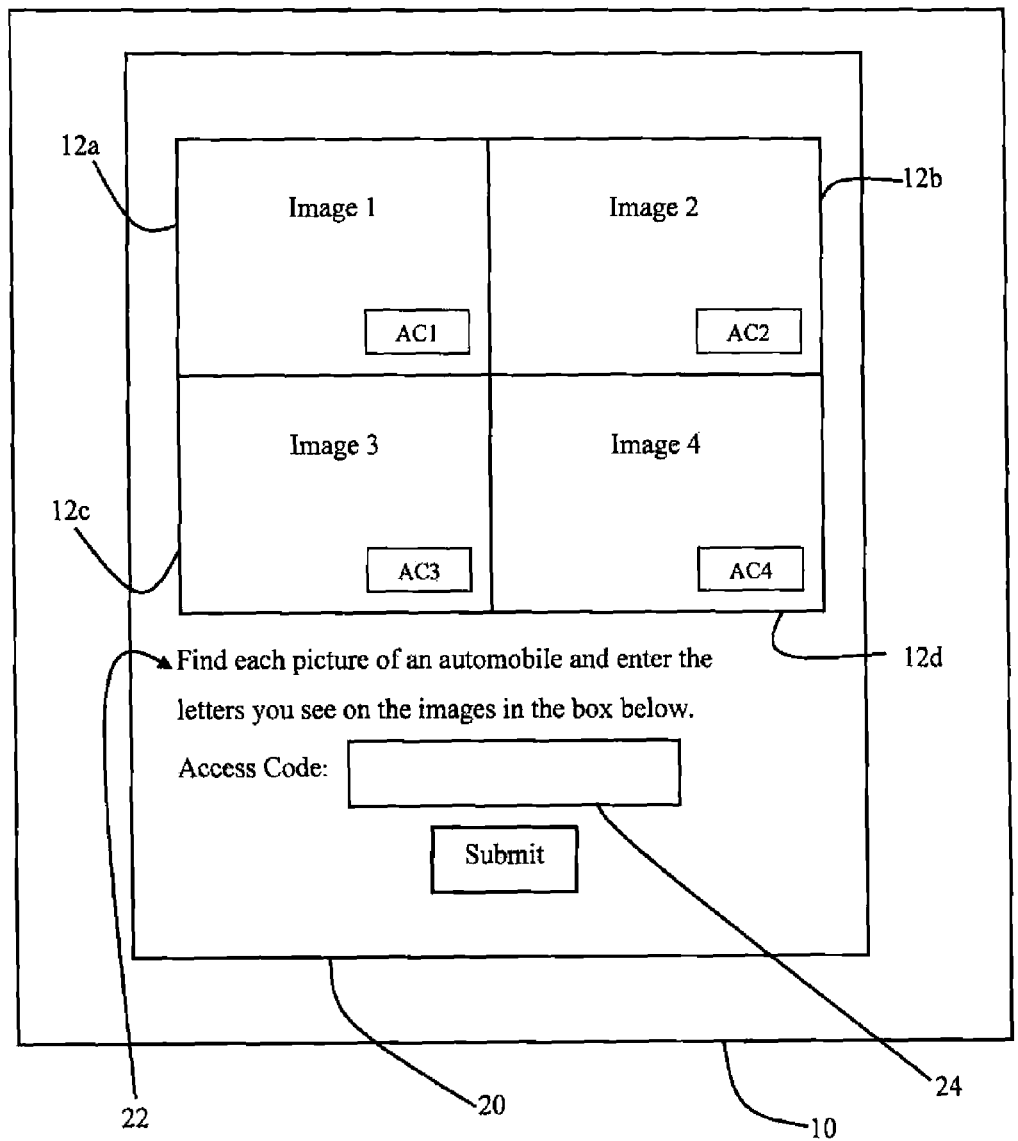
FIG. 2 shows a display device for presenting the dynamic graphical arrangement of FIG. 1 to a user.

Turning now to FIG. 2, one or more images such as icons can be displayed to a user on a display device 10 according to a predetermined arrangement or pattern. For each displayed image (12, 14, 16, and 18) within a graphical arrangement 20, there may be a corresponding access code (AC1, AC2, AC3, AC4 . . . ) shown to the user. The series of one or more access codes can be therefore entered by the user as a response to the test for that particular access session. However, the same access code may not work for subsequent access sessions in accordance with a preferable embodiment of the invention. Rather the selection of the images themselves, their arrangement or location within a pattern, and their corresponding access codes are preferably different each time in order to create a dynamic one-time graphical user test. It shall be understood that as with other embodiments of the invention herein, each or all of these properties are not required to be dynamic and may be static (the same) instead during or in between access sessions.

The series of one or more images and corresponding access codes that make-up the dynamic access codes are preferably changed between each authentication processes. However, the selected category of images may remain the same or changed by the service provider per access session.

The selected category and non-selected categories of graphical images are not limited to particular objects only but can include any variety of themes or topics. This allows a wide variety of categories. The images (12a, 12b, 12c, 12d) of FIG. 1 are presented to the user and may be displayed on a Web enabled computer or mobile device. It shall be further understood that the one or more images may be organized in a selected arrangement such as a series of rows and columns (matrix), arrays or any other pattern within a display image.

The display device 10 illustrated in FIG. 2 may receive information to render a dynamic graphical arrangement in the form of a transaction verification page. The graphical arrangement may comprise two images and two corresponding access codes. Image 1 (12a) may comprise an image of an automobile, while images 2-4 may comprise images from various categories not selected for the image identification task. In addition, image 1 may include and display a corresponding access code AC1 comprising an alphanumeric character such as the letter "A" and images 2-4 may include and display corresponding access codes that are the letter "X, Y, and Z." The system may display instructions 22 to the user requiring them to select all images of automobiles displayed on the user's device. The user would input the letter "A" or alternatively may click the image of the automobile to generate an input from the user comprising the unique randomly generated access code corresponding to the at least one image from the selected category. An authentication server system (not shown) connected to the display device via a network can compare the selected access codes against an authenticating reference code to confirm the user is a human and not a computer. Preferable embodiments of the invention would render different images to the user within a selected category, a different selected category or different access codes (alpha-numeric characters, symbols) each time the website or form fill page is accessed Another embodiment of the invention may capitalize on the focus and attention of users during the testing process for advertising and marketing purposes. For example, as shown in FIG. 2, a dynamic graphical arrangement grid may be displayed wherein the images comprise advertisements or messages paid by sponsors or advertisers. As part of an advertisement (ad) campaigns for a company, one or more advertisements can be introduced into the systems and methods described herein. Such advertisements or sponsored messages can serve the dual-purpose of verifying the user is human and generating advertising revenue. The advertisements or messages themselves can function as the images viewed by users which fall into selected and non-selected categories. While user attention may be greater for advertisements relating to a selected category for the user, advertisements relating to non-selected categories are also valuable as they too are displayed.

A dynamic image grid as shown in FIG. 2 may include a selected arrangement of advertisements (ads) that may be rendered during each verification process for different users. The arrangement may include any number of ads displayed for viewing, but a preferable embodiment of the invention may have nine (9) image ads arranged in a 3×3 grid each having a to corresponding access code (AC). Because of the wide range of available categories for carrying out the invention, each category presents advertising opportunities within many different channels. For example, a category may be selected such as automobiles. Images 2 and 3 (12bm 12c) may thus include ads for cars sold by a car manufacturer and images 1 and 4 (12a and 12d) may include ads for bottles of wine sold by a wine maker. Upon presentation of the dynamic graphical arrangement, a user is instructed to select images from the selected category assigned for the access session and to type or enter within an access code field 24 the characters displayed for images from the selected category. One skilled in the art will appreciate the user may be instructed to select images from more than one selected category without departing from the spirit of the invention.

It shall be understood that ads or images herein may fall within one or more categories available as a way to verify a human. Ads or graphical images can be also displayed more often within regularly scheduled display cycles even if they are within non-selected categories. The ads or images that are selected for display within an arrangement may nevertheless capture the attention of users even if they do not necessarily fall within a selected category since images or ads for non-selected categories are also displayed.

Figure 3A:
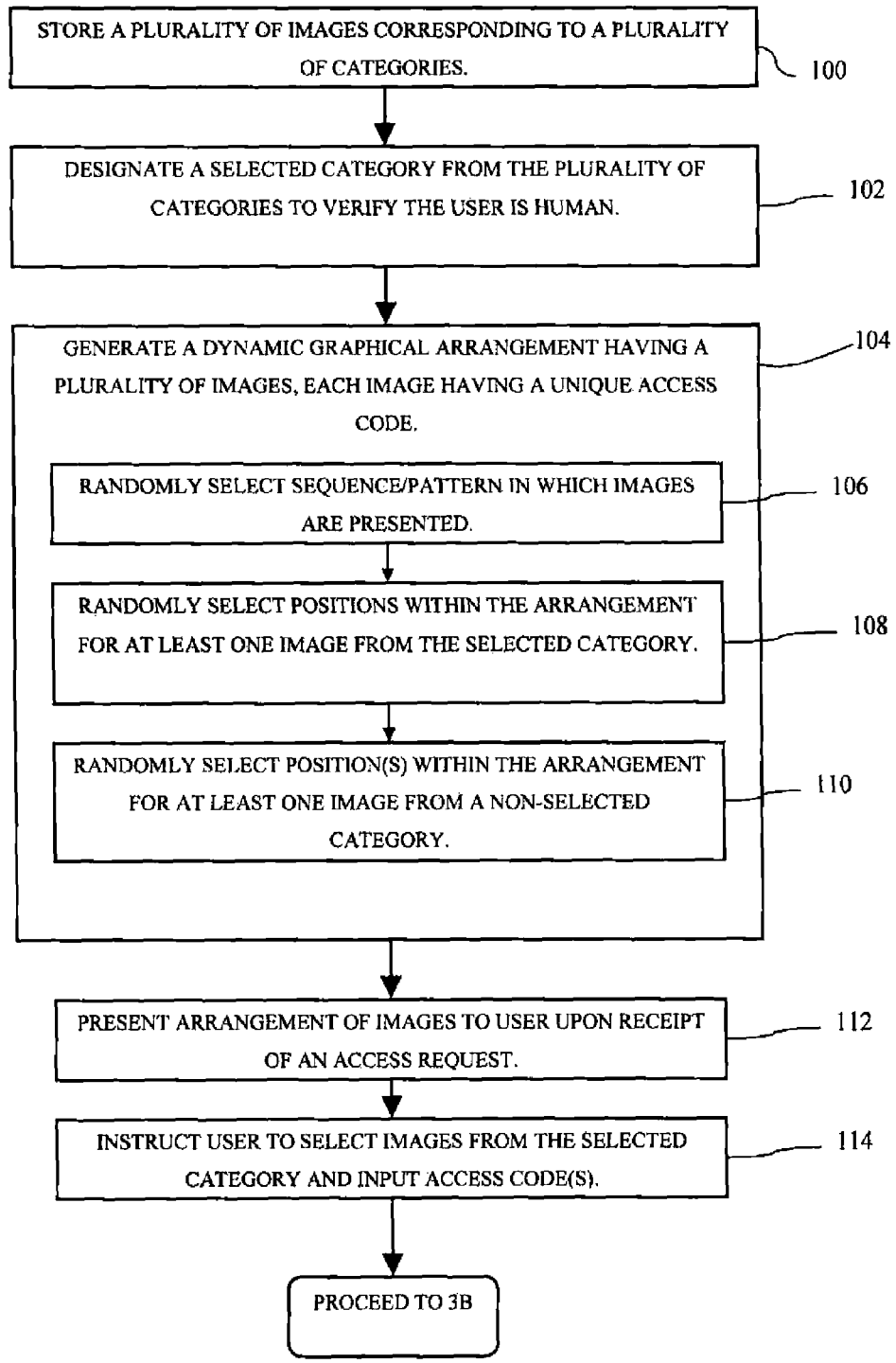
FIG. 3 is a flowchart describing a method for generating a completely automated test comprising the dynamic graphical arrangement of FIG. 1 to tell computers and humans apart.
Figure 3B:
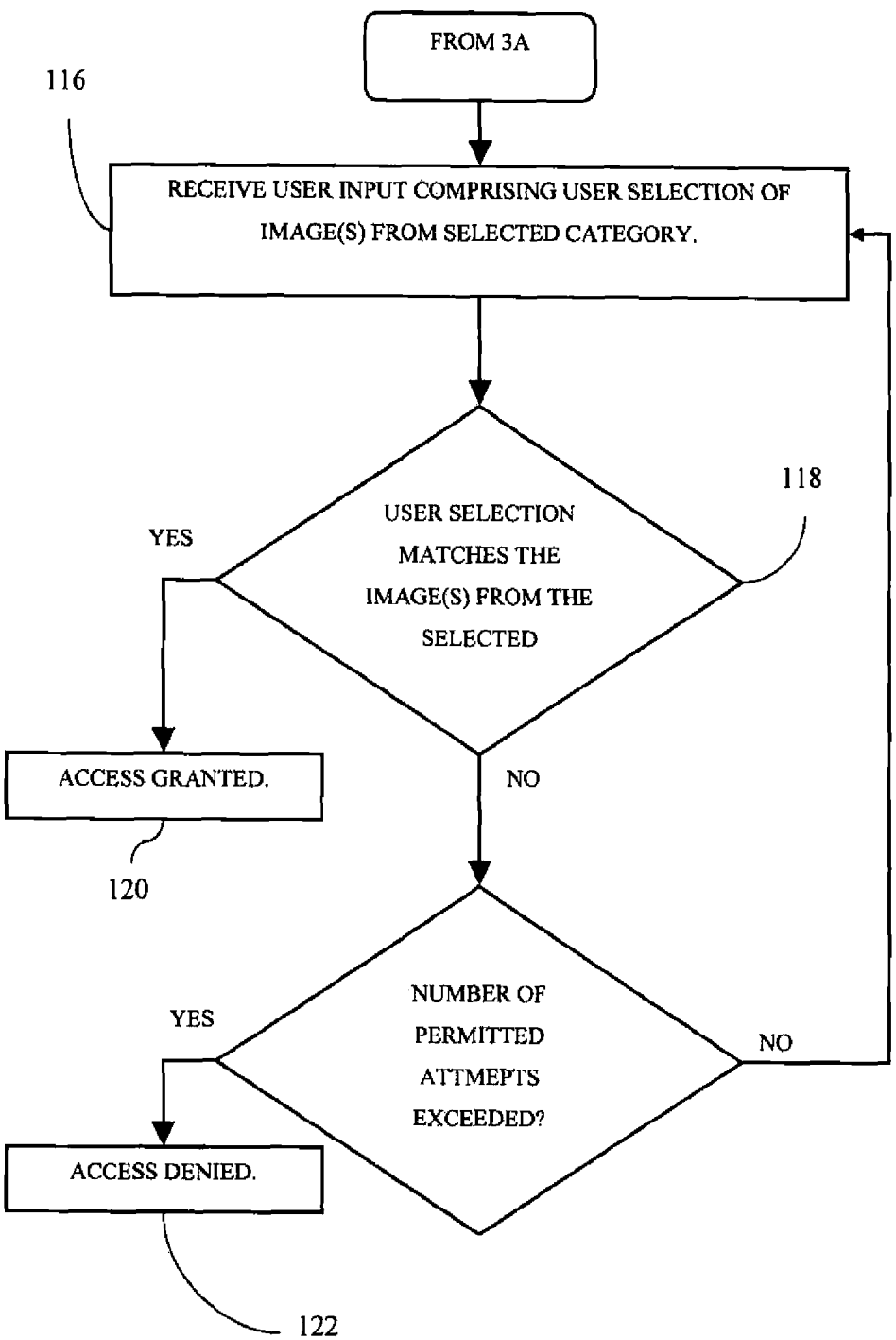

FIG. 3 is a flow diagram describing an embodiment of the system and method of the present invention. At Step 100 a plurality of images may be stored within a database or a computer memory that correspond to one or more available categories. From the numerous available categories, the system may designate a selected category from the plurality of categories to verify the user is human (Step 102). In response to an attempt to access a website or web-based form, a dynamic graphical image arrangement may be generated by a server system containing at least one graphical image, and at least one corresponding access code (Step 104). For example, a random access code generator may construct an authenticating reference code for an access session, such as "A7."

Each character or digit within the access code may be assigned as the image identifier (or part thereof) to preselected images falling with the selected category. A series of other images from non-selected categories may be also assigned access to codes to fill-out the arrangement. The server system may be instructed to randomly select (or not) the pattern in which to present the graphical images to the user (Step 106). The graphical images falling within the selected category may be randomly (or not) positioned (Step 108) within the arrangement, and their corresponding access codes also displayed. Furthermore, the graphical images from non-selected categories can be randomly (or not) positioned within remaining portions of the arrangement (Step 110). For example, two (2) graphical images of one or more cars can be displayed as part of a selected category of automobiles, each having a corresponding image identifier "A," and "7." In an embodiment of the invention where a 2×2 image grid is provided (4 images total), two (2) images from non-selected categories are displayed to fill-out the arrangement which preferably have nothing to do with automobiles. The access code information and associated data for the generated arrangement is then stored by the server system in a memory. The arrangement or layout of the images, the images themselves, and the characters of the displayed access codes, are preferably different between access sessions. Alternatively, any or all of these properties may remain the same (static) in between access sessions.

During an access session, the arrangement of dynamic graphical images can be delivered and presented to a user on a display device or display within the client system upon receipt of an access request (Step 112). The user is instructed to select images from the selected category by typing the access codes corresponding to the images from the selected categorie(s) (Step 114). The client system receives the input from the user, and transmits it to the server system (Step 116), which compares the access codes to the stored authenticating reference code (e.g., A7) (Step 118). When the user input matches the authentication reference code stored in the server system, authentication can be completed and access granted (Step 120) to the requested resource or website. When image identifier information or a password does not match the authentication reference code, then access is denied. As with other embodiments of the invention, a user may be also permitted a predetermined number of attempts before account lock-out or any other administrative action is instituted such as the implementation of network security measures indicating the possibility of an automated attack (Step 122).

FIG. 4 illustrates a system provided in accordance with the present invention. A server system may include or be configured as a server 40 that generates the dynamic graphical arrangement 42 of images each associated with an access code for display on a user device 43. The arrangement 42 may include one or more images 44 from one or more selected categories (see FIG. 3), plus one or more images from the non-selected category. Thereafter the arrangement 42 may be sent to the user device 43 for display on a display device 46. The user may select or input the access codes corresponding to the images selected within the arrangement 44. Selected access codes may then be communicated by the user device 43 to the server system 40. The server system 40 can compare (Comparator 48) the user selected access codes relative to an authenticating reference code, and further analyze related information with any other associated data that may be stored in a memory within the server system 40. Upon the correct entry of the one or more access codes, which matches the authenticating reference code, verification of the user as human can be completed.

The systems provided herein may also include a service provider server 50 with which a first user interacts in an attempt to gain access to information or services provided thereby.

The server 40 (system) may control access to a resource, a database or file system, or a private communication channel. The server 40 may also include a computer readable memory 52, the comparator 48 and a communications interface such as a modem or network adapter (not shown) with appropriate software drivers that support communication with the website provider 50 via the Internet. The server system may further include a secured network, file systems or resources and information stored in databases as described elsewhere herein. The databases may contain one or more libraries of images or icons that can be displayed for verifying the user is human and other purposes (e.g., advertising). The server system 40 may also include numerous devices such as file servers (Web site servers), authentication servers, password databases, repositories or databases of images or icons that may be identified as part of selected and non-selected categories.

The memory device 52 in the server system may store information regarding the relationship between the images and access codes displayed to a user during an access session. A memory look-up table can be used to store this information for mapping this information. The memory may be implemented using random access memory ("RAM"), flash memory, disk drives or any other rewritable memory technology. In some applications, the memory may also be implemented using non-rewritable memory such as read only memory ("ROM") chips.

The user access device may include various devices such as a desktop or laptop computer, a PDA, an ATM, or any device capable of displaying images having a key entry pad keyboard, or other device for selecting images from the selected category. The user access device preferably includes an input device 54, the display device 56 and an appropriate communications interface (not shown) which allows data from the input device to be transmitted to the server system and/or service provider 50. The communications interface might include a modem, network adapter, radio transmitter/receiver, or other such communications devices, along with appropriate software. The display device 56 may be any type of display capable of displaying various images, such as computer monitors and flat panel displays.

Furthermore, the user access device 43 and server systems 40 can communicate over a variety of telecommunication systems including wireless networks. The telecommunications system may also include a variety of data communications systems generally known in the art such as a LAN, a WAN, a wireless system such as cellular, satellite and personal communications services ("PCS") systems, or a dedicated line or connection. In this regard, it is noted that the references to server side and client side herein do not require a direct communication therebetween and intermediate computers may be present. Moreover, a computer acting as a server could transmit information to an intermediate computer which could then transmit the information to another computer where the user enters data.

As shown in FIG. 4, a user may select an access device 43 on which to access a resource or information stored on the service provider server 50. In one embodiment of the present invention the user may be identified by the server system 40 with an account identifier, name or other user identification information. In this case when the server system 40 determines the user is a recognized user, it can generate a display image 42 including an arrangement of dynamic graphical arrangement of images 44 arranged for presentation on the display device 43.

As with other embodiments of the invention, the server 40 may generate the display image by selecting images based a selected category. Alternatively, the display image may be pre-generated or displayed according to a pre-established routine or computer program, and stored in a database system. The display image 42 and dynamic graphical arrangement may be implemented as a bit mapped image, a raster image or in any other suitable image file format.

The dynamic graphical arrangement 44 may also include access codes corresponding to each of the images displayed. The user may input the access codes corresponding to images from the selected category.

The user enters on the input device 54 the access codes and communicates the input to the server system 40. The server system 40 may utilize the comparator 48 to compare the selected access codes with reference access codes as described elsewhere herein. The comparator 48 in the server system 40 can compare the one or more access codes entered by the user to reference access codes to determine whether they correspond to each other and match. If so, the user will be allowed appropriate access to the service provider's server and/or website 50. It shall be understood that the comparator, and other components to the aforementioned client/server systems implemented in any of the authentication systems and methods herein, may incorporate software using techniques known in the prior art.

Many embodiments of the invention can provide dynamic graphical arrangements that can be incorporated into existing authentication and human verification system for preventing unauthorized or automated access. Because cyber crimes often begin with unauthorized users gaining access to accounts to online accounts and applications, concepts of the invention herein can also be implemented to create a first line of defense that provides stronger user authentication. Various embodiments of the invention may be used with security protocols to provide secure login routines for user authentication that are effective against many prevalent forms of hacking, including historic threats like phishing, as well as new and growing threats like brute-force attacks, keystroke logging, and man-in-the-middle (MITM) spying. Additional embodiments of the invention can be modified for a variety of applications including network login, virtual private network (VPN) access, and web-based applications and Web sites.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. These are described as examples in relation to the drawings attached hereto and further modifications, apart from those shown or suggested herein, may be made within the spirit and scope of the invention. Furthermore, it shall be understood that all aspects of the invention are not limited to the specific configurations set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for generating a completely automated test to tell computers and humans apart comprising:
   generating a matrix of non-overlapping randomly selected images in response to an access request of a user, the dynamic graphical arrangement comprising one randomly selected image from a selected image category chosen for an image recognition task and at least one image not from the selected image category, wherein each image is associated with a unique randomly generated access code, wherein the image recognition task comprises an instruction to select one image corresponding to the selected image category from the matrix of non-overlapping randomly selected images;
   presenting the dynamic graphical arrangement of randomly selected images to the user and communicating the image recognition task to the user;
   receiving an input from the user access device at a server system, the input comprising the unique randomly generated access code associated with the one image from the selected category;
   the server system comparing the input from the user access device to an authenticating reference code to confirm the user is a human and not a computer; and
   wherein the matrix comprises at least one image known to belong to the selected image category, at least one image known to not belong to the selected image category and at least one image suspected to belong to the selected image category and wherein the user is still granted access to the website when the input from the user access device comprises selection of the at least one image known to belong to the selected image category and selection or omission of the at least one image suspected to belong to the selected image category.

2. The method of claim 1 further comprising receiving an access request from a user access device before generating the matrix.

3. The method of claim 2 wherein the access request comprises an account identifier and an access device identifier.

4. The method of claim 1 wherein at least one of the plurality of randomly selected images comprises an advertisement.

5. The method of claim 4 wherein the advertisement comprises a hyperlink to an advertiser website.

6. The method of claim 1 wherein the access codes comprise alphanumeric characters.

7. The method of claim 1 wherein the matrix is presented to the user on a Web enabled computer or mobile device.

8. The method of claim 1 wherein at least two of the plurality of images are from the selected image category and wherein the input from the user comprises a first access code associated with a first image from the selected image category and a second access code different from the first access code and associated with a second image from the selected image category.

9. A method for selectively accepting access requests from a client computer connected to a server computer by a network, the method comprising:
   receiving an access request from the client computer at an authentication server;
   the authentication server generating a matrix of non-overlapping images in response to the access request, wherein the matrix of non-overlapping images comprises at least one randomly selected image from a randomly selected image category chosen for an image recognition task and at least one image not from the randomly selected image category, wherein the image recognition task comprises an instruction to select one image corresponding to the selected image category from the matrix of non-overlapping randomly selected images;
   presenting the dynamic graphical arrangement of images on an output device of the client computer;
   receiving an input from the client computer at the authentication server, the input comprising a user selection of at least one image;
   the authentication server accepting the access request if the user selection of the at least one image corresponds to the image chosen from the selected image category and otherwise denying the access request; and
   wherein the matrix comprises at least one image known to belong to the selected image category, at least one image known to not belong to the selected image category and at least one image suspected to belong to the selected image category and wherein the user is still granted access to the website when the input from the user access device comprises selection of the at least one image known to belong to the selected image category and selection or omission of the at least one image suspected to belong to the selected image category.

10. The method of claim 9 wherein selecting the user selection of at least one image comprises pointing at and clicking the image with a cursor.

11. The method of claim 9 further comprising randomly assigning a randomly generated access code to each image of the dynamic graphical arrangement and wherein the user selection of at least one image comprises input of at least one of the randomly generated access codes.

12. The method of claim 9 wherein the randomly generated access codes comprise alphanumeric characters.

13. The method of claim 9 further comprising receiving an access request from an access device before generating the matrix.

14. The method of claim 13 wherein the access device comprises a Web enabled computer or mobile device.

15. The method of claim 13 wherein the access request comprises a user account identifier.

16. The method of claim 9 wherein at least one of the plurality of images comprises an advertisement.

17. The method of claim 16 wherein the advertisement comprises a hyperlink to an advertiser website.

* * * * *